(12) United States Patent
Gaucher et al.

(10) Patent No.: US 11,247,642 B2
(45) Date of Patent: Feb. 15, 2022

(54) DEVICE FOR CONNECTING A WIPER BLADE TO A DRIVE ARM FOR A VEHICLE

(71) Applicant: Valeo Systèmes d'Essuyage, Le Mesnil Saint Denis (FR)

(72) Inventors: Vincent Gaucher, Issoire (FR); Stéphane Houssat, Issoire (FR); Guillaume Mouleyre, Issoire (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 416 days.

(21) Appl. No.: 16/123,402

(22) Filed: Sep. 6, 2018

(65) Prior Publication Data

US 2019/0100170 A1 Apr. 4, 2019

(30) Foreign Application Priority Data

Sep. 29, 2017 (FR) ...................................... 1759150

(51) Int. Cl.
*B60S 1/40* (2006.01)
*B60S 1/38* (2006.01)

(52) U.S. Cl.
CPC .......... *B60S 1/4006* (2013.01); *B60S 1/3863* (2013.01); *B60S 2001/4022* (2013.01); *B60S 2001/4035* (2013.01)

(58) Field of Classification Search
CPC .... B60S 1/4019; B60S 1/4006; B60S 1/4009; B60S 1/4016; B60S 1/4074; B60S 2001/4022; B60S 2001/4035; B60S 2001/4032; B60S 2001/4058;
(Continued)

(56) References Cited

U.S. PATENT DOCUMENTS 1,612,462 A * 12/1926 Mumford ............ E05D 11/1078
16/351
2,922,669 A * 1/1960 Hansen ............... E05D 11/1078
403/96
(Continued)

FOREIGN PATENT DOCUMENTS

DE 10 2007 016 479 A1 10/2008
FR 2738201 * 3/1997
(Continued)

OTHER PUBLICATIONS

Machine translation of description portion of German publication 102007016479, published Oct. 2008. (Year: 2008).*

(Continued)

*Primary Examiner* — Gary K. Graham
(74) *Attorney, Agent, or Firm* — Osha Bergman Watanabe & Burton LLP (57) ABSTRACT

The invention relates to a connecting device (8) intended to join a wiper blade (4) to a driving arm (2) of a wiping system (1) for a vehicle, comprising at least one connector (9) and a cover (11) mounted in a rotatable manner on the connector (9), the connecting device (8) comprising at least one holding device (22) for holding the cover (11) on the connector (9) in at least one position, characterized in that the holding device (22) determines the position of the cover (11) on the connector (9), limiting the rotation of this cover (11) on the connector (9) in two directions of rotation (S1, S2).

12 Claims, 4 Drawing Sheets (58) Field of Classification Search
CPC ..... B60S 2001/4061; Y10T 403/32319; Y10T 403/32327; Y10T 403/32361
USPC .................................................... 15/250.32
See application file for complete search history.

(56) References Cited

U.S. PATENT DOCUMENTS

| | | | | |
|---|---|---|---|---|
| 2,977,141 | A * | 3/1961 | Ryck .................... | B60S 1/40 403/189 |
| 4,670,934 | A * | 6/1987 | Epple .................... | B60S 1/4016 15/250.32 |
| 5,920,950 | A * | 7/1999 | Young, III ............ | B60S 1/4016 15/250.32 |
| 6,036,050 | A * | 3/2000 | Ruane .................... | B65D 43/24 16/334 |
| 6,609,267 | B1 * | 8/2003 | Journee .................... | B60S 1/40 15/250.32 |
| 7,096,536 | B2 * | 8/2006 | Johnson .............. | E05D 11/1085 16/300 |
| 2014/0201938 | A1 * | 7/2014 | Park ........................ | B60S 1/38 15/250.48 |
| 2015/0246659 | A1 * | 9/2015 | Park ........................ | B60S 1/4009 15/250.32 |
| 2016/0059829 | A1 * | 3/2016 | Poton .................... | B60S 1/4016 15/250.32 |
| 2016/0176383 | A1 * | 6/2016 | Lee ........................ | B60S 1/4016 15/250.32 |

FOREIGN PATENT DOCUMENTS

| | | |
|---|---|---|
| FR | 2 830 823 A1 | 4/2003 |
| WO | 2005/102802 A1 | 11/2005 |

OTHER PUBLICATIONS

Preliminary Search Report and Written Opinion issued in corresponding French Patent Application No. 1759150, dated Jun. 15, 2018 (6 pages).

* cited by examiner

DEVICE FOR CONNECTING A WIPER BLADE TO A DRIVE ARM FOR A VEHICLE

The invention relates to the field of wiping the glazed surfaces of a vehicle, notably a motor vehicle, and relates more particularly to a connecting device between a wiper blade and a driving arm thereof.

Wiping systems for motor vehicles are designed to remove liquids and dirt, which can disrupt the driver's view of his surroundings, by wiping. These wiping systems generally comprise at least one driving arm which effects an angular back-and-forth movement over a glazed surface of the vehicle, and at least one wiper blade equipped with a blade rubber made of a flexible plastics material. By rubbing against this glazed surface, the blade rubber wipes the water and some of the dirt therefrom, in order to evacuate them from the driver's field of view.

Regardless of the configuration of the wiper blade: articulated brackets which retain the blade rubber in several distinct zones, or a metal vertebra which holds the blade rubber along its entire length, the wiper blade is attached to the driving arm of the wiping system by a connecting device which generally comprises a connector and an adapter. The connector is secured to the wiper blade, and the adapter is a part that is configured to cooperate with the connector and also to be fitted together with an end part of the driving arm. The connector and the adapter then cooperate in order to fasten the wiper blade to the driving arm, and allow an articulated connection between these two latter members.

The connecting device of such wiping systems can also comprise a cover which is mounted in a rotatable manner on the connector and comprises an opening for an end part of the driving arm to pass through. In this type of connecting device, the adapter is generally housed in the connector and comprises a shaft that is intended to receive a hook formed on the end part of the driving arm, thereby allowing the articulated connection between the wiper blade and its driving arm.

When the user wishes to mount the wiper blade on its driving arm, he needs to pivot this cover into an "open" position in order to be able to fit the end part of this driving arm on the adapter housed in the connector. Once the wiper blade has been mounted on its driving arm, the user pivots the cover again, in the opposite direction, into a "closed" position.

A first drawback of this connecting device resides in the range through which the cover can pivot about the connector. Specifically, when the user wishes to mount the wiper blade on its driving arm, there is a risk of excessive rotation of the cover with respect to the connector, which can damage the cover and thus make it unusable.

A second drawback of these connecting devices resides in the fact that, once open, the cover tends to rock spontaneously towards its closed position on account of gravity, and this can hamper the user who wishes to mount the wiper blade on its driving arm.

The present invention falls within this context and aims to provide a connecting device for remedying these drawbacks by virtue of a holding device for holding the cover on the connector in at least one precise position suitable for mounting the wiper blade on the driving aim.

The subject of the present invention is thus a connecting device intended to join a wiper blade to a driving arm of a wiping system for a vehicle, comprising at least one connector and a cover mounted in a rotatable manner on the connector, the connecting device comprising at least one holding device for holding the cover on the connector in at least one position. According to the invention, the holding device determines the position of the cover on the connector, limiting the rotation of this cover on the connector in two directions of rotation.

According to one aspect of the present invention, the holding device for holding the cover on the connector can make it possible to hold the cover either in a first position or in a second position, this first position being different from the second position.

For example, the first position can correspond to a closed position, namely a position in which the cover at least partially covers the connector on which it is mounted, while the second position can correspond to open position, namely a position configured to allow an end part of the driving arm to be fitted on an adapter housed in the connector. In other words, when the cover is in its closed position, this cover and the connector on which it is mounted both extend longitudinally in one and the same direction, whereas, when the cover is in its open position, the cover and the connector extend longitudinally in two directions that are perpendicular, or approximately perpendicular.

Advantageously, the present invention thus makes it possible to hold the cover in a closed position, thereby ensuring reliable and durable locking of the end part of the driving aim on the adapter, or in an open position, allowing this wiper blade to be mounted on its driving arm, without risking excessive rotation of the cover, which could damage it and make it unusable. Moreover, holding the cover in the open position makes it easier to insert the end part of the driving arm, avoiding a situation in which this cover flaps back spontaneously, ultimately impeding the mounting of the wiper blade on the driving arm, it being understood that this mounting is usually carried out by a person who is inexperienced in this field, for example the owner of the vehicle equipped with the wiping system that uses the connecting device according to the invention.

According to one feature of the present invention, the connecting device comprises a pivot connection between the cover and the connector, this pivot connection comprising at least one bearing and at least one trunnion, the trunnion being configured to be received in an orifice formed in the bearing.

According to one exemplary embodiment of the present invention, the bearing of the pivot connection between the cover and the connector is produced as one with the cover and the trunnion of this pivot connection is for its part produced as one with the connector.

According to another exemplary embodiment of the present invention, the bearing of the pivot connection between the cover and the connector is produced as one with the connector and the trunnion of this pivot connection is for its part produced as one with the cover of the connector.

Advantageously, according to this other exemplary embodiment, the connector can comprise two bearings and the cover two trunnions that are respectively intended to be received in one of the orifices formed in the bearings of the connector. In this case, it will be understood that the bearings are symmetric with respect to a longitudinal and vertical mid-plane of the connector, and that the trunnions are symmetric with respect to a longitudinal and vertical mid-plane of the cover. The longitudinal mid-plane of the connector and the longitudinal mid-plane of the cover are coincident when the cover is in its closed position.

According to one aspect of the present invention, the holding device for holding the cover on the connector is disposed at least partially on the bearing. According to this aspect of the present invention, a part of the holding device for holding the cover on the connector is thus disposed on the bearing, this bearing being for example produced as one with the connector, and another part of this holding device is for its part disposed close to the trunnion, this trunnion being for example produced as one with the cover. The expression "close to the trunnion" is understood to mean that this other part of the holding device can be distributed around this trunnion. It will be understood that each of these parts of the holding device for holding the cover on the connector is configured to cooperate with the other.

According to the present invention, the holding device for holding the cover on the connector comprises at least one rib and at least one groove, the rib being intended to be received in the groove.

Advantageously, the holding device for holding the cover on the connector can comprise a rib, advantageously a single rib, at least one first groove and at least one second groove, the rib being intended to be received in either one of the grooves.

Thus, when the rib is received in one of the grooves, for example the first groove, the cover is held in its first position, and when this rib is received in the other groove, in this case the second groove, the cover is held in its second position.

According to one exemplary embodiment of the present invention, the rib is formed on the cover, and at least one groove is formed on the connector.

According to this exemplary embodiment, the rib can be for example produced as one with the trunnion of the cover.

According to another exemplary embodiment, the rib is formed on the connector, and at least one groove is formed on the cover.

According to one aspect of the present invention, the cover is configured to take up a first position or a second position, this first position and this second position being determined by the holding device for holding the cover on the connector, the cover, in its first position, extending in a first longitudinal direction, and the cover, in its second position, extending in a second direction different from the first direction.

Advantageously, the first longitudinal direction can be perpendicular or approximately perpendicular to the second direction.

It will be understood that, according to this aspect of the present invention, the holding device for holding the cover on the connector comprises at least two grooves that are respectively designed to limit the rotation of this cover, either when the latter is in its first position or when it is in its second position. In other words, these two grooves delimit an angular sector of the bearing on which they are formed, this angular sector being, according to this aspect of the present invention, approximately equal to 90°.

Optionally, the holding device for holding the cover on the connector can comprise a member designed to increase the force for rotating the cover with respect to the connector between the two positions taken up by the cover.

According to one embodiment of the present invention, the member designed to increase the force for rotating the cover with respect to the connector between its first position and its second position is a gradual slope formed between two grooves of the holding device for holding the cover on the connector.

According to one feature of the present invention, the first groove and the second groove of the holding device for holding the cover on the connector jointly delimit a first angular sector, and a third groove can be formed in a second angular sector on the opposite side from the first angular sector with respect to an axis of rotation of the pivot connection.

According to this feature of the present invention, the third groove can be for example formed in continuation of one of the two grooves, passing through the axis of rotation of the pivot connection.

This third groove is configured to guide the fitting of the cover on the connector. Thus, a method for mounting the cover on the connector can comprise a first step of disposing the rib in the third groove and then a step of moving the cover in translation over the connector, until the trunnion of the pivot connection is housed in the orifice formed in the bearing of this pivot connection.

If the third rib is formed in continuation of one of the two other ribs, it will be understood that once the trunnion is in position in the orifice in the bearing, the rib formed on the cover is housed in the groove, in continuation of which the third groove is formed.

Advantageously, the third groove is formed in continuation of the first groove, this first groove being configured to hold the cover in its first position, namely its closed position.

According to one variant, the third groove can be formed in continuation of the second groove, this second groove being configured to hold the cover in its second position, namely its open position.

If the third groove is not formed in continuation of one of the two other grooves, the method for mounting the cover comprises an additional step of rotating the cover until the rib is housed in the first groove or in the second groove.

Advantageously, the connecting device can comprise two holding devices for holding the cover on the connector, which are symmetric with respect to a longitudinal and vertical mid-plane of the connector.

The present invention also relates to a wiping system for a vehicle, comprising at least one wiper blade joined to a driving arm by a connecting device according to the present invention.

The present invention also relates to a motor vehicle comprising at least one wiping system according to the present invention.

Finally, the invention relates to a method for mounting a wiper blade on a driving arm of a wiping system according to the present invention, comprising a step of opening a cover mounted in a rotatable manner on a connector of the wiper blade, a step of locking this cover in its open position by virtue of the holding device for holding the cover on the connector, a step of inserting an end part of the driving arm into an adapter housed in the connector, a step of closing the cover, and a step of locking this cover in its closed position by virtue of the holding device for holding this cover on the connector.

It will be understood that the step of opening the cover corresponds to a step in which a user pivots the cover in a first direction of rotation into its second position and that the step of closing this cover corresponds to a step in which the user pivots the cover in a second direction of rotation, opposite to the first direction of rotation, into its first position.

Further features, details and advantages will become more clearly apparent from reading the detailed description given below by way of indication and with reference to the various embodiments illustrated in the following figures.

In the rest of the description, the designations longitudinal or transverse refer to the orientation of a connector of a connecting device of a wiping system. The longitudinal direction corresponds to a longitudinal direction of extension of the connector, this longitudinal direction being parallel to an axis Ox of an orthonormal frame of reference for example depicted in FIG. 1. A transverse direction corresponds to a direction parallel to an axis Oy of this orthonormal frame of reference, the axis Oy being perpendicular to the axis Ox. A vertical direction corresponds to a direction parallel to an axis Oz of the orthonormal frame of reference, the axis Oz being perpendicular to the axis Ox and to the axis Oy.

The longitudinal sections mentioned below are realized in section planes in which the axes Ox and Oz of this orthonormal frame of reference are inscribed.

Figure 1:
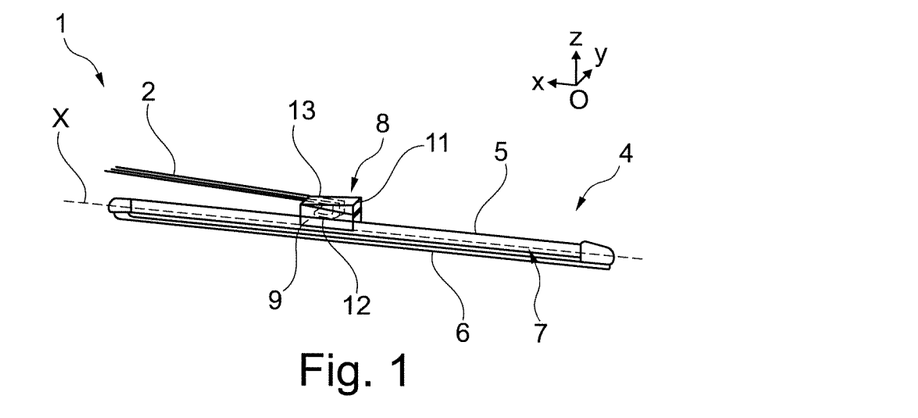
FIG. 1 is a schematic depiction of a wiping system comprising a connecting device according to the present invention.

With reference to FIG. 1, a motor vehicle is commonly equipped with a wiping system 1 for evacuating water and/or dirt present on a glazed surface, notably a rear window or a windscreen of the motor vehicle. The wiping system 1 comprises a driving arm 2 that is able to carry out an angular back-and-forth movement along and over the glazed surface. The driving arm 2 can comprise a driver, not illustrated here, intended to provide a mechanical connection between the driving arm 2 and a drive shaft for driving the driving arm 2 in rotation.

The wiping system 1 also comprises a wiper blade 4, which extends mainly along a longitudinal axis X parallel to the axis Ox of the orthonormal frame of reference depicted in FIG. 1. The wiper blade 4 comprises at least one air deflector 5 and a blade rubber 6, which are joined together by a structural element 7 of the wiper blade 4, the latter thus not having yokes. Such a structural element 7 can be formed for example by a single bending member, or by a plurality of bending members, or by a support in which one or more bending members are inserted.

The air deflector 5 is provided to convert a pressure applied by an airflow flowing along the glazed surface into a pressing force pressing the wiper blade 4 against the glazed surface of the motor vehicle. The blade rubber 6 is the part of the wiper blade 4 that is in direct contact with the glazed surface and is configured to evacuate the water and/or dirt present thereon. The air deflector 5, the blade rubber 6 and the structural element 7 form a semi-rigid assembly carried by a connecting device 8, interposed between the driving arm 2 and the wiper blade 4.

This connecting device 8 comprises a connector 9 in which an adapter—not shown here—is housed and on which a cover 11 is mounted in a rotatable manner. The adapter conventionally comprises a transverse shaft configured to receive a hook 12 of an end part 13 of the driving arm 2.

The connecting device 8 thus ensures a pivoting mechanical connection between the end part 13 of the driving arm 2 and the wiper blade 4. This connecting device 8 also makes it possible to separate the wiper blade 4 from the driving arm 2 in order to replace the wiper blade 4.

In addition to an aesthetic function, the cover 11, which is mounted in a rotatable manner on the connector 9, is intended to lock the end part 13 of the driving arm 2 on the adapter of the connecting device 8. This cover 11 can thus take up a first, "closed" position, in which it locks this end part 13 of the driving arm 2, or a second, "open" position, allowing the insertion of this end part 13 into the connecting device 8.

According to the present invention, the connecting device 8 comprises at least one holding device for holding the cover 11 on the connector 9 in at least one of these two positions. This holding device for holding the cover 11 on the connector 9 will be described in more detail later in the description.

Figure 2:
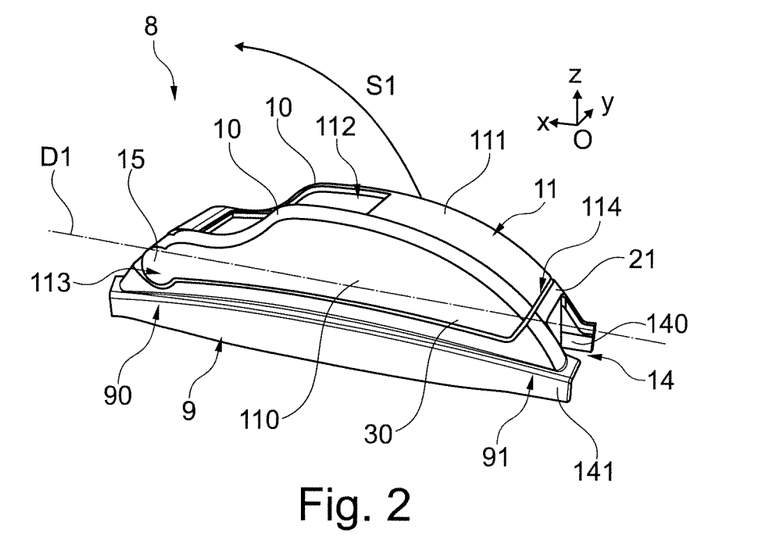
FIGS. 2 and 3 are perspective views of a connector of the connecting device according to the present invention, on which a cover is mounted in a rotatable manner, these figures illustrating a first position and a second position, respectively, of this cover with respect to the connector.
Figure 3:
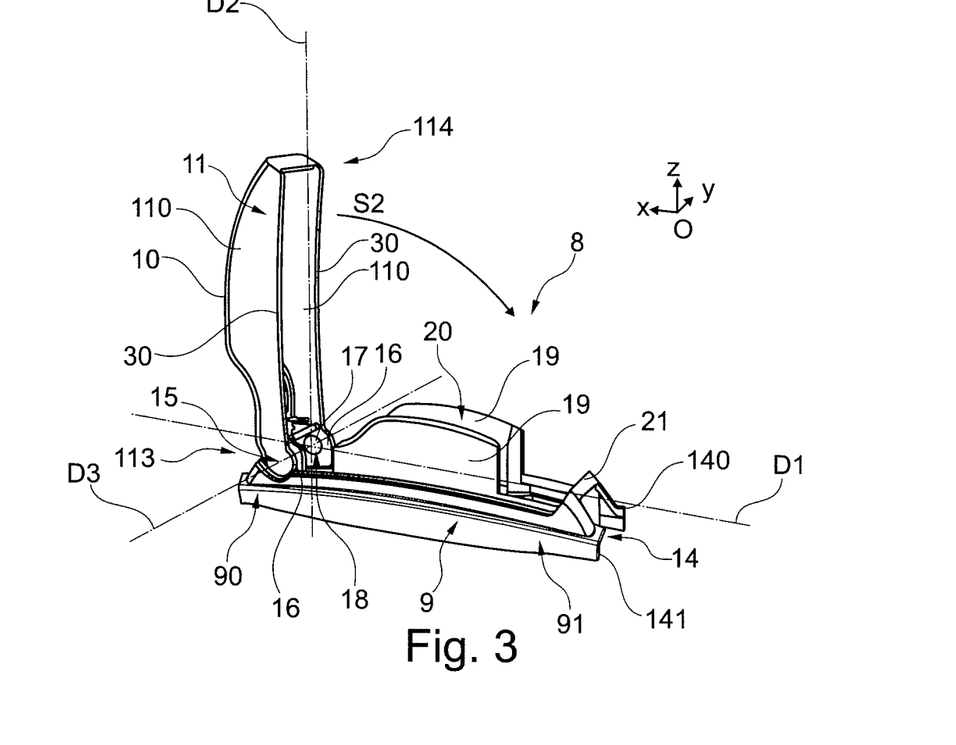

FIGS. 2 and 3 illustrate the first position of the cover 11 on the connector 9 and the second position of this cover 11 on the connector 9, respectively.

The first position of the cover 11, illustrated in FIG. 2, is the "closed" position, namely the position which allows the driving arm to be locked on the wiper blade comprising the connector 9. From this first position, the cover 11 can reach its second position by virtue of rotation in a first direction of rotation S1, as shown in this FIG. 2.

The second position of the cover 11, illustrated in FIG. 3, is the "open" position, namely the position of this cover 11 which allows the insertion of the hook of the end part of the driving arm into the adapter housed in the connector 9. From this second position, the cover 11 can reach its first position by virtue of rotation in a second direction of rotation S2, opposite to the first direction of rotation S1, as shown in FIG. 3.

In order to make it easier to read the figures, the adapter is not shown.

The cover 11 comprises two side walls 110, which are symmetric with respect to a longitudinal mid-plane of the connector 9 and are connected together by an upper wall 111. A "longitudinal mid-plane" is understood to be a plane that is parallel to the plane Oxz of the orthonormal frame of reference and passes through a centre of the connector 9, i.e. this longitudinal mid-plane is disposed at an equal distance from each of the side walls 110 of the cover 11.

Each of the side walls 110 of the cover 11 comprises a shared edge 10 with the upper wall 111 and a free edge 30 that is intended to be in contact with the connector 9.

In order to allow the insertion of the driving arm into the connecting device 8, the upper wall 111 of the cover 11 comprises an opening 112, which can be seen notably in FIG. 2. This opening 112 is also configured to allow the closure of the cover 11 once the end part of the driving arm has been inserted into the connecting device 8. As is shown in FIG. 2, this opening 112 extends between two opposite edges of the upper wall 111, these two opposite edges being the shared edges 10 between the upper wall 111 and each side wall 110.

As illustrated in FIG. 2, the cover 11 extends mainly in a first longitudinal direction D1 when it is in its first position, this first direction D1 being parallel to the axis Ox of the orthonormal frame of reference.

In this first position, the cover 11 comprises a first longitudinal end 113 and a second longitudinal end 114, at the opposite end from the first longitudinal end 113. As can be seen for example in this FIG. 2, the first longitudinal end 113 of the cover 11 has a rounded shape.

The first longitudinal end 113 and the second longitudinal end 114 of the cover 11 each have a shape complementary to that of the connector 9 on which they are disposed. It will then be understood that the rounded shape of the first longitudinal end 113 of the cover 11 makes it easier to rotate the cover 11 with respect to the connector 9.

As can be seen in these FIGS. 2 and 3, the connector 9 also extends mainly in the first longitudinal direction D1 and comprises a coupling zone 14 for coupling the connector 9 to the structural element of the wiper blade. This coupling zone 14 comprises for example two skirts 140, 141, which are configured to enclose this structural element of this wiper blade.

The connector 9 has a first longitudinal end 90 and a second longitudinal end 91, at the opposite end from the first longitudinal end 90 in the first longitudinal direction D1.

As can be seen in FIG. 3, the connector 9 comprises two flanks 19, which are symmetric with respect to the longitudinal mid-plane of the connector 9, and which extend parallel to one another and towards the cover 11. These flanks 19 delimit a space 20 configured to receive the adapter of the connecting device and are entirely covered by the cover 11 when the latter is in its first, "closed" position.

The second longitudinal end 91 of the connector 9 comprises an upright wall 21 against which the second longitudinal end 114 of the cover 11 bears, as shown notably in FIG. 2.

As mentioned above, the cover 11 is mounted in a rotatable manner on the connector 9. The connecting device 8 thus comprises a pivot connection 15 between this cover 11 and this connector 9, this pivot connection 15 being realized by cooperation between the first longitudinal end 90 of the connector 9 and the first longitudinal end 113 of the cover 11.

This pivot connection 15 between the cover 11 and the connector 9 comprises at least one trunnion 17 and at least one bearing 16 in which an orifice 18 configured to receive the trunnion 17 is formed. Advantageously, the trunnion 17 and the orifice 18 in the bearing 16 of the pivot connection 15 have complementary shapes allowing one to rotate with respect to the other.

In this case, the pivot connection 15, which can be seen better in FIG. 3, comprises two bearings 16 produced as one with the connector 9 and two trunnions 17 produced as one with the cover 11. An orifice 18 is formed in each bearing 16, these orifices 18 being respectively configured to receive one of the trunnions 17 formed on the cover 11. The two bearings 16 and the two trunnions 17 are symmetric with respect to the longitudinal mid-plane of the connector 9.

According to an exemplary embodiment that is not illustrated here, the pivot connection comprises a single bearing produced as one with the connector and a single trunnion produced as one with the cover, this trunnion being configured to be received in an orifice formed in the bearing of the connector. It will be understood that, according to this exemplary embodiment, the bearing and the trunnion are formed on one and the same side with respect to the longitudinal mid-plane of the connector.

As illustrated in FIG. 3, the cover 11 extends, in its second position, mainly in a second direction D2 perpendicular, or approximately perpendicular, to the first direction D1. This second direction D2 is, according to an example shown in this FIG. 3, a vertical direction, i.e. a direction parallel to the axis Oz of the orthonormal frame of reference.

As illustrated notably in FIG. 3, the cover 11 is rotatable about a third direction D3 perpendicular to the first direction D1 and the second direction D2. In other words, this third direction D3 is parallel to the axis Oy of the orthonormal frame of reference as shown in these figures and forms an axis of rotation of the pivoting connection 15.

As mentioned above, the connecting device according to the present invention comprises at least one holding device for holding the cover on the connector, which will now be described in more detail with reference to FIGS. 4 to 7.

Figure 4:
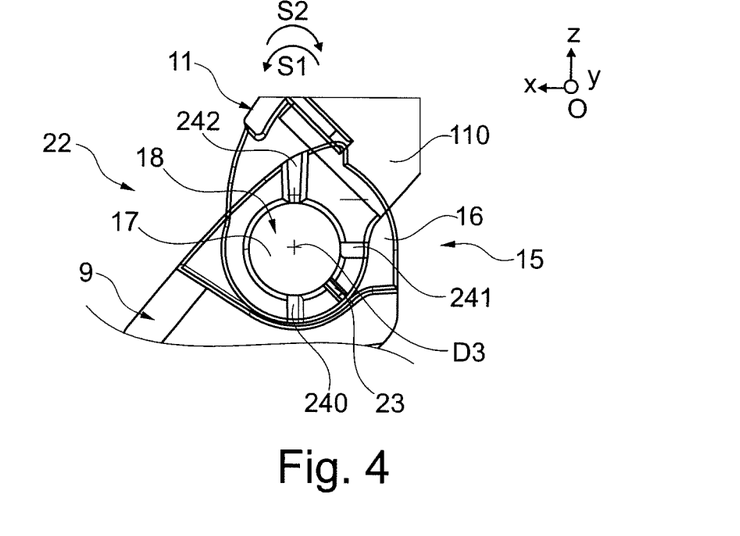
FIG. 4 is a side view of a pivot connection between the cover and the connector, this pivot connection comprising a holding device for holding the cover in position on the connector in at least one position.

FIG. 4 thus illustrates an exemplary embodiment of this holding device 22, which is disposed at the pivot connection 15 between the cover 11 and the connector 9. According to this exemplary embodiment, the holding device 22 comprises a rib 23 and at least two grooves referenced 240, 241, the rib 23 being intended to be received in either one of these grooves 240, 241.

This FIG. 4 is a side view of this pivot connection 15 in which the cover 11 has been rendered partially transparent in order to make the holding device 22 for holding the cover 11 on the connector 9 visible.

The objective of this holding device 22 is to hold the cover 11 either in its first, "closed" position or in its second, "open" position. It will thus be understood that this holding device 22 allows the cover 11 to rotate between these two positions and only locks the cover 11 when the latter is in one or the other of these positions.

The expression "locks the cover" is understood to mean that when the cover 11 is in its first position or in its second position, the holding device 22 limits the rotation of this cover 11 in the first direction of rotation S1 and in the second direction of rotation S2. In order to pass from one position to the other, the intervention of a user is required, who has to apply a force in the first direction of rotation S1 or in the second direction of rotation S2 depending on the position that he wishes to reach, such that the rib 23 can leave the groove in which it is received.

The holding device 22 makes it possible notably to avoid excessive rotation during the opening of the cover 11, that is to say when this cover 11 pivots in the first direction of rotation S1. This is because excessive rotation of this cover 11 could damage it and make it unusable.

The holding device 22 also makes it easier to insert the end part of the driving arm by allowing the cover 11 to be held in its second, open position. Thus, the cover 11 cannot flap back spontaneously during the insertion of this driving arm. Indeed, such spontaneous flapping back of the cover 11 is not desirable since this would lead to a reduction in size of the opening 112 with regard to the end part of the driving arm, making the insertion thereof particularly complicated.

As illustrated in FIG. 4, the holding device 22 is arranged at the pivot connection 15 between the connector 9 and the cover 11, one part of this holding device 22 being formed on at least one of the bearings 16 of the connector 9, and another part of this holding device 22 being formed on the cover 11, and advantageously close to the trunnions 17 received in the orifices 18 formed in the bearings 16, as described above. More specifically, the other part of this holding device 22 is distributed around the trunnions 17.

As mentioned above, the holding device 22 according to the exemplary embodiment illustrated in FIG. 4 comprises a first groove 240 and a second groove 241. The first groove 240 and the second groove 241 are intended to hold the cover in its first, closed position and in its second, open position, respectively. A third groove 242 can also be formed at the pivot connection 15, this third groove 242 being a guide groove, configured to make it easier to fit the cover 11 on the connector 9.

According to the example illustrated in FIG. 4, this third groove 242 is formed in continuation of the first groove 240.

When the user wishes to mount the wiper blade on its driving arm, he firstly has to pivot the cover 11 such that the latter takes up its second position. By exerting sufficient force, the user can cause the rib 23 to leave the first groove 240, and then pivot this cover 11 in the first direction of rotation S1 described above.

During the rotation of the cover 11 with respect to the connector 9, the rib 23 moves between the first groove 240 and the second groove 241, as is shown in FIG. 4. It will be understood that, in order to allow this rotation, the side walls 110 of the cover 11 are made of an elastically deformable material, i.e. that these side walls 110 are configured to move apart in order to allow the rib 23 to leave the first groove 240 in which it is received. Once the rotation has been carried out, the side walls 110 of the cover 11 are configured to return to their initial spacing in order to allow the rib 23 to be placed in the second groove 241, this second groove 241 being configured to lock the cover 11 in its second, open position.

Once the driving aim has been mounted in the connecting device by the end part being introduced into the opening in the cover 11, the user can pivot the cover 11 in the second direction of rotation S2 until the rib 23 is again received in the first groove 240. As described above, when the rib 23 is received in the first groove 240, the cover 11 is held in its first, closed position, this first position of the cover 11 making it possible to at least partially lock the driving arm in the connecting device. It will be understood that the rotation steps for passing from the first position to the second position are similar to those for passing from the second position to the first position.

Thus, a method for fitting the cover 11 on the connector 9 can comprise a step in which the rib 23 formed on the cover 11 is received in the third groove 242, and a step of moving the cover 11 in translation with respect to the connector 9 until the trunnions 17 formed on the cover 11 are respectively received in one of the orifices 18 formed in the bearings 16 of the connector 9.

The rib 23 and the grooves 240, 241, 242 forming the holding device for holding the cover 11 on the connector 9 will now be described in more detail with reference to FIGS. 5 and 6.

Figure 5:
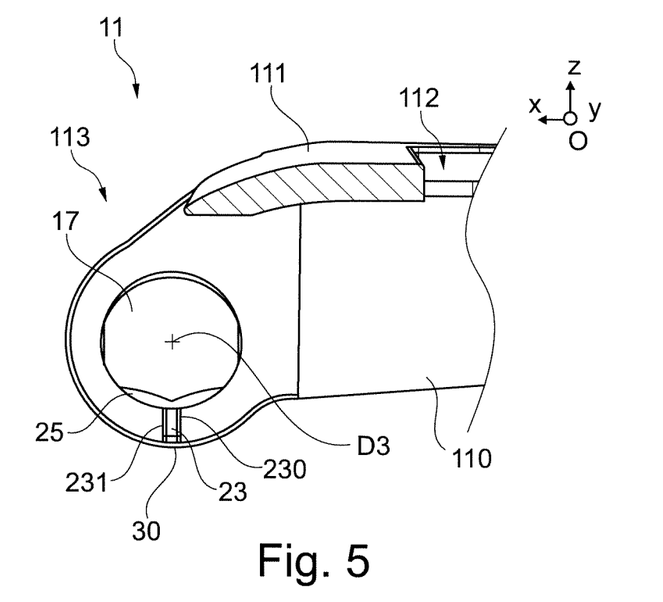
FIGS. 5 and 6 illustrate a first longitudinal end of the cover and a first longitudinal end of the connector, respectively.

FIG. 5 illustrates the first longitudinal end 113 of the cover 11, as seen in a cross section passing through a longitudinal mid-plane of this cover 11. As a reminder, a "longitudinal mid-plane" is understood to mean a plane that is parallel to the plane Oxz of the orthonormal frame of reference and passes through a centre of the cover 11. This FIG. 5 thus reveals one of the trunnions 17 of this cover 11. As mentioned above, the two trunnions of this cover 11 are symmetric, and it will thus be understood that the description of the trunnion 17 illustrated in FIG. 5 is transferable to the other trunnion, which is not visible in this FIG. 5.

This trunnion 17 has a substantially circular shape and comprises a chamfer 25 configured to make it easier to insert this trunnion 17 into the orifice formed in at least one of the bearings of the connector. According to an exemplary embodiment illustrated in FIG. 5, the rib 23 is produced as one with the trunnion 17 and extends from this trunnion to the free edge 30 of the corresponding side wall 110. More specifically, this rib 23 is formed in line with the chamfer 25 of this trunnion 17. As is shown, this rib 23 is rectilinear and extends radially with respect to the axis of rotation D3 of the pivot connection. The rib 23 also comprises two parallel flanks 230, 231.

Figure 6:
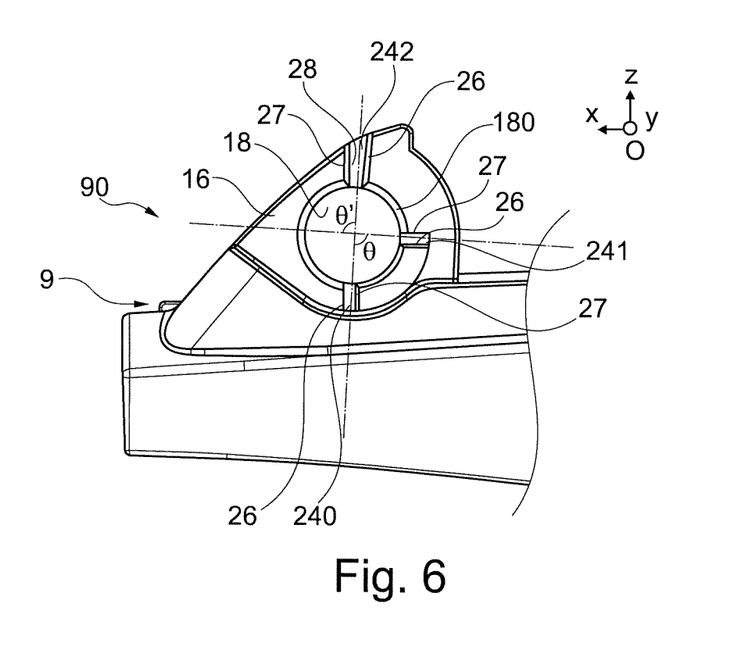

For its part, FIG. 6 illustrates the first longitudinal end 90 of the connector 9 on which one of the bearings 16 of the connector 9 is formed, seen in a cross section on the longitudinal mid-plane of this connector 9. As described above, this bearing 16 comprises the orifice 18 configured to receive one of the trunnions of the cover.

According to an exemplary embodiment illustrated in this FIG. 6, three grooves 240, 241, 242 are formed in this bearing 16. As mentioned above, the first groove 240 and the second groove 241 are configured to hold the cover in its first position or in its second position, respectively, while the third groove 242 makes it possible to guide the cover over the connector 9 while it is being fitted.

Each of these grooves 240, 241, 242 is formed by a rectilinear cutout which extends radially from the orifice 18 formed in the bearing 16. As illustrated, the orifice 18 is delimited by a circular contour 180 which has a chamfer. It will be understood that this chamfer extends around the entire periphery of the orifice 18. Advantageously, this chamfer makes it easier to insert the trunnion into this orifice 18 in order to form the pivot connection.

Each of these grooves 240, 241, 242 is delimited by a first edge 26 and by a second edge 27 and comprises a bottom 28. It will be understood that in order to allow a part of a flank of the rib to be in abutment against at least a part of one of the edges 26, 27 of one of these grooves 240, 241, 242, a depth of each groove, measured between the bottom 28 of the groove 240, 241, 242 in question and one of its edges 26, 27 is equal to or greater than a thickness of the rib, this thickness of the rib being measured along a straight line parallel to the axis Oy of the orthonormal frame of reference. Thus, when the rib is received in one of the grooves 240, 241, 242, the side wall of the cover comprising the trunnion from which the rib extends is disposed in contact with the bearing 16 in which these grooves 240, 241, 242 are formed.

As is shown in FIG. 6, the first groove 240 and the second groove 241 together delimit a first angular sector θ of the bearing 16. According to the exemplary embodiment illustrated in FIG. 6, this first angular sector is approximately equal to 90°. In other words, the first edge 26 and the second edge 27 of the first groove 240 extend mainly in directions perpendicular to directions in which the first edge 26 and the second edge 27, respectively, of the second groove 241 mainly extend.

For its part, the third groove 242 is formed in all positions of a second angular sector θ', on the opposite side from the first angular sector θ with respect to the axis of rotation D3 of the pivot connection 15. According to the exemplary embodiment illustrated in FIG. 6, the third groove 242 is formed in continuation of the first groove 240, namely at the limit of the second angular sector θ'. Thus, when the cover is mounted on the connector, this cover is directly inserted in its first position.

According to an exemplary embodiment that is not illustrated here, the rib can be formed on at least one of the bearings of the connector and at least one groove can, for its part, be formed close to at least one of the trunnions formed on the cover. According to this exemplary embodiment, the rib then formed on the bearing(s) of the connector is configured to cooperate with the at least one groove formed close to the trunnion(s), in the same way as described above.

According to a refinement of the present invention, a member 29 can be designed to increase the force for rotating the cover with respect to the connector.

Figure 7:
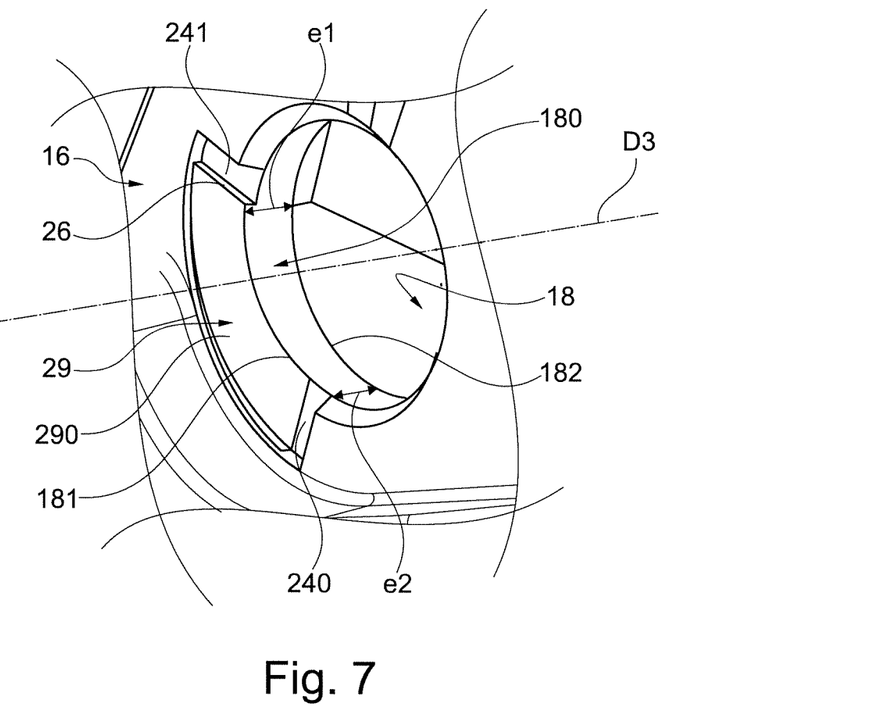
FIG. 7 is a perspective view of one particular embodiment of the holding device for holding the cover on the connector illustrated in FIGS. 4 to 6.

An exemplary embodiment of this member 29 designed to increase the rotating force is illustrated in FIG. 7. This FIG. 7 is a detail view of the other bearing 16 of the connector 9, that is to say of the bearing 16 that is not shown in FIG. 6. As mentioned above, these two bearings 16 are symmetric with respect to the longitudinal mid-plane of the connector.

As can be seen in FIG. 7, the member 29 designed to increase the force for rotating the cover with respect to the connector is realized by an inclined wall 290 formed on the bearing 16, between the first groove 240 and the second groove 241. This inclined wall 290 notably allows the side walls of the cover to be spaced apart gradually as it is rotated on the connector 9.

Advantageously, this inclined wall 290 also allows the user to better control the force applied to the cover, allowing him to be provided with feedback during the rotation of this cover on the connector. In other words, the closer the user gets to the second groove 241, the more force needs to be applied to the cover in order to turn it. Moreover, when the rib formed on the cover passes over the first edge corner 26 of this second groove 241, the side walls of the cover return to their initial position suddenly, thereby clearly indicating to the user that the cover has reached its second position, ready for mounting the wiper blade on the driving arm.

Thus, the contour 180 delimiting the orifice 18 formed in the bearing 16 has different thicknesses. As shown in FIG. 7, this contour 180 is delimited by a first edge corner 181 and by a second edge corner 182 that are opposite one another along the axis of rotation D3 of the pivot connection.

As illustrated, a first thickness e1 is greater than a second thickness e2 of this contour 180. These thicknesses e1 and e2 are both measured between the first edge corner 181 and the second edge corner 182 of this contour 180, in a direction parallel to the axis of rotation D3 of the pivot connection. The first thickness e1 is measured close to the second groove 241, while the second thickness e2 is measured close to the first groove 240.

It will thus be understood that the force to be applied during the rotation of the cover in the first direction of rotation, namely to open this cover, is greater than the force to be applied during the rotation of this cover in the second direction of rotation, namely to close this cover.

It will also be understood that the force to be applied to remove the rib from the first groove 240 is less than the force to be applied to remove this rib from the second groove 241.

This gradual slope can also be realized in the opposite direction, thereby making the required force greater in the second direction of rotation.

It will be understood that this gradual slope is only one exemplary embodiment of the member designed to increase the force for rotating the cover with respect to the connector and that any other member that obtains this same effect is also conceivable.

It will be understood from the above that the present invention thus makes it easier to fit a cover on a connector of a connecting device of a wiping system for a vehicle and makes it possible to hold this cover in position with respect to the connector in order to make it possible, firstly, to insert a driving arm into this connecting device and, secondly, to lock this driving arm in this connecting device, while avoiding the risk of excessive rotation of the cover with respect to the connector, which could damage this cover.

The invention is not limited to the means and configurations described and illustrated herein, however, and also extends to all equivalent means or configurations and to any technically operational combination of such means. In particular, the shape and dimensions of the rib and/or of the grooves of the holding device for holding the cover on the connector can be modified without detriment to the invention, as long as they provide the functionalities described in the present document.

The invention claimed is:

1. A connecting device that joins a wiper blade to a driving arm of a wiping system of a vehicle, the connecting device comprising:
   at least one connector comprising a coupling zone that couples the at least one connector to a structural element of the wiper blade, the at least one connector comprising two symmetrically spaced flanks that extend parallel with respect to a longitudinal mid-plane of the at least one connector;
   a cover mounted in a rotatable manner on an exterior of the at least one connector, the cover comprising two side walls that are disposed symmetrically with respect to the longitudinal mid-plane of the at least one connector and are linked by an upper wall;
   at least one holding device that holds the cover on the at least one connector in at least one position, wherein the at least one holding device determines the position of the cover on the at least one connector, limiting the rotation of the cover on the at least one connector in two directions of rotation; and
   a pivot connection disposed between the cover and the at least one connector, the pivot connection comprising at least one bearing and at least one trunnion, the at least one trunnion being received in an orifice formed in the at least one bearing;
   wherein the at least one holding device that holds the cover on the at least one connector comprises at least one rib and at least one groove, the at least one rib being received in the at least one groove;
   wherein the at least one holding device is disposed on the pivot connection such that the at least one rib is disposed on one of the at least one trunnion or the at least one bearing and the at least one groove is disposed on the other one of the at least one trunnion or the at least one bearing; and
   wherein, in a closed position, the cover entirely covers the two symmetrically spaced flanks, and, in an open position, the driving arm of the wiping system may be inserted into a space between the two symmetrically spaced flanks.

2. The connecting device according to claim 1, wherein the at least one holding device that holds the cover on the at least one connector is disposed at least partially around the at least one trunnion.

3. The connecting device according to claim 1, wherein the at least one holding device that holds the cover on the at least one connector comprises a single rib, at least one first groove and at least one second groove, the single rib being intended to be received in either the at least one first groove or the at least one second groove.

4. The connecting device according to claim 3, wherein the at least one first groove and the at least one second groove of the at least one holding device that holds the cover on the at least one connector jointly delimit a first angular sector, and wherein a third groove is formed in a second angular sector on an opposite side from the first angular sector with respect to an axis of rotation of the pivot connection.

5. The connecting device according to claim 4, wherein the third groove is formed in continuation of the at least one first groove or the at least one second groove, passing through the axis of rotation of the pivot connection.

6. The connecting device according to claim 1, wherein the at least one rib is formed on the cover, and wherein the at least one groove is formed on the at least one connector.

7. The connecting device according to claim 1, wherein the at least one rib is formed on the at least one connector, and wherein the at least one groove is formed on the cover.

8. The connecting device according to claim 1,
wherein the cover is configured to take up a first position and a second position, the first position and the second position being determined by the at least one holding device that holds the cover on the at least one connector, and
wherein the cover, in the first position, extends in a first longitudinal direction, and the cover, in the second position, extends in a second direction different from the first longitudinal direction.

9. The connecting device according to claim 8, wherein the at least one holding device that holds the cover on the at least one connector comprises a member that increases a force for rotating the cover with respect to the at least one connector between the first position and the second position taken up by the cover.

10. The connecting device according to claim 9, wherein the member that increases the force that rotates the cover with respect to the at least one connector between the first position and the second position is an inclined wall formed between a first groove and a second groove of the at least one holding device that holds the cover on the at least one connector.

11. The connecting device according to claim 1,
wherein the at least one holding device comprises two holding devices that hold the cover on the at least one connector, and
wherein the two holding devices are symmetric with respect to a longitudinal and vertical mid-plane of the at least one connector.

12. A wiping system for a vehicle, comprising:
at least one wiper blade;
a connecting device comprising:
at least one connector comprising a coupling zone that couples the at least one connector to a structural element of the at least one wiper blade, the at least one connector comprising two symmetrically spaced flanks that extend parallel with respect to a longitudinal mid-plane of the at least one connector;
a cover mounted in a rotatable manner on an exterior of the at least one connector, the cover comprising two side walls that are disposed symmetrically with respect to the longitudinal mid-plane of the at least one connector and are linked by an upper wall;
at least one holding device that holds the cover on the at least one connector in at least one position, wherein the at least one holding device determines the position of the cover on the at least one connector, limiting the rotation of the cover on the at least one connector in two directions of rotation; and
a pivot connection disposed between the cover and the at least one connector, the pivot connection comprising at least one bearing and at least one trunnion, the at least one trunnion being received in an orifice formed in the at least one bearing;
wherein the at least one holding device that holds the cover on the at least one connector comprises at least one rib and at least one groove, the at least one rib being received in the at least one groove;
wherein the at least one holding device is disposed on the pivot connection such that the at least one rib is disposed on one of the at least one trunnion or the at least one bearing and the at least one groove is disposed on the other one of the at least one trunnion or the at least one bearing; and
wherein, in a closed position, the cover entirely covers the two symmetrically spaced flanks, and, in an open position, a driving arm of the wiping system may be inserted into a space between the two symmetrically spaced flanks; and
wherein the at least one wiper blade is joined to the driving arm by the connecting device.

* * * * *